June 12, 1962  A. W. BREWER ET AL  3,038,848
METHOD AND APPARATUS FOR DETECTING AND MEASURING
TRACE CONSTITUENTS IN AIR AND OTHER GASES
Filed June 20, 1958
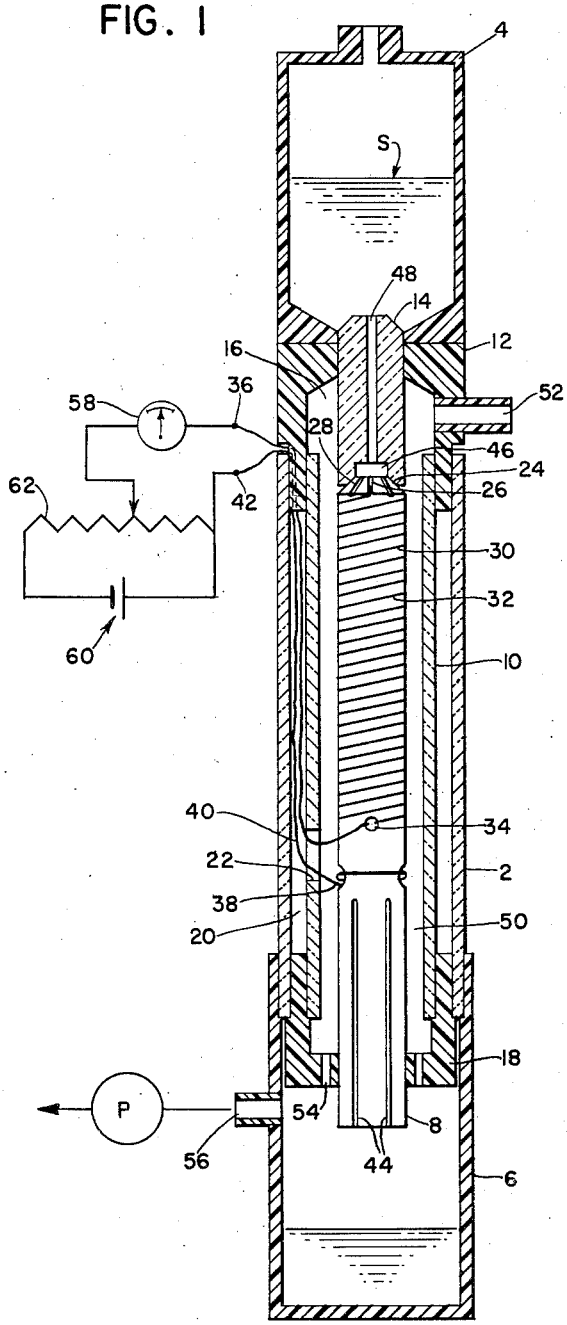
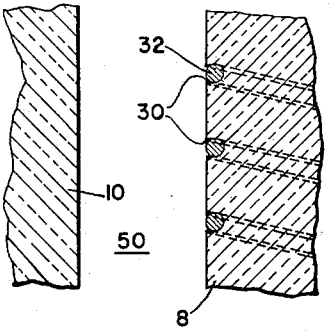
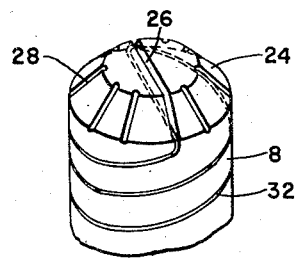
INVENTORS
A. W. BREWER &
J. R. MILFORD
BY
ATTORNEY United States Patent Office 3,038,848
Patented June 12, 1962

3,038,848
METHOD AND APPARATUS FOR DETECTING AND MEASURING TRACE CONSTITUENTS IN AIR AND OTHER GASES
Alan West Brewer and James Richard Milford, Oxford, England, assignors to Mast Development Company, Davenport, Iowa, a corporation of Iowa
Filed June 20, 1958, Ser. No. 743,234
11 Claims. (Cl. 204—195)

This invention is an advance in the sensing and measurement of trace constituents in air or other gases. Because of its small size and weight it is of special use in balloon sounding of the ozone content of the atmosphere up to altitudes of 10 miles and beyond.

It is an object of this invention to provide an automatic quantitative analysis of high accuracy and sensitivity for various gaseous pollutants in the atmosphere. For example, with the proper construction and reagents it can detect a few parts of ozone per hundred million parts of air.

In general it is another object of this invention to provide an instrument which is applicable to the sensing of dilute chemicals in gaseous form for which more or less specific reagents are available that have the characteristics of releasing an ion that will result in the electrolytic conduction where the number of ions released is proportional to the number of molecules of the substance being sensed.

The specific example of sensing ozone has been mentioned. It is a further object to provide an instrument for the sensing of hydrogen sulphide as a trace constituent of air, hydrogen as a trace constituent of oxygen and other applications of this invention.

The foregoing and other important objects and features will become apparent to those versed in the art as a preferred embodiment of the invention is disclosed by way of example in the ensuing description and accompanying sheet of drawing, the figures of which are described below.

FIGURE 1 is a longitudinal section of the instrument or apparatus.

FIGURE 2 is an enlarged perspective of the upper end of the electrode support.

FIGURE 3 is an enlarged section of a portion of the electrode support and sleeve.

This apparatus consists essentially of an electrode which is wetted with a very thin layer of the sensing reagent, while a very thin layer of gas sample is drawn over the electrode at a measured rate.

The apparatus comprises an outer housing 2 which is preferably cylindrical, a top container 4, a bottom container 6, a central electrode support 8, and an interior cylindrical sleeve 10. The containers 4 and 6 are of any suitable material inert to the chemical solution used, such as plastic material, e.g., polyethylene, and the parts 2, 8, and 10 are rigid non-conductors made of glass or its equivalent. Adjacent to the container 4 is an inverted cup 12 which serves as a spacer for the housing 2 and sleeve 10, a locating means for a capillary tube 14, and an entrance chamber 16 for the gas sample. A lower polyethylene cup 18 operates as a spacer between the lower ends of the sleeve 10 and housing 2 to afford between said parts an annular space 20 and serves also as a locating means for the electrode support 8. The cup 18 has a plurality of gas escape passages 54. The bottom container 6 has an air-tight sliding fit with the exterior of the housing 2 for removal therefrom for cleaning purposes. The housing 2 is primarily an enclosure which increases the structural strength of the apparatus and is necessary because of an opening 22 in sleeve 10.

The electrode support 8 is preferably a cylinder or rod of glass or equivalent material with a finely ground surface to improve its wettability. The top of this support terminates in a conical surface 24 which is cut across by a slot 26 and has a plurality of radial grooves 28 (FIGURE 2). The support has bifilar helical grooves 30 (FIGURE 3) into which is laid a metallic wire 32 to form one electrode. Both ends of the wire 32, which is wound on the electrode support 8 in a double helix, pass through a hole 34 to anchor it, thence through the opening 22 in the sleeve 10, up along the annular space 20 and is carried between the housing 2 and inverted cup 12 to a terminal 36. Also wound in an annular groove 38 on the electrode support 8 is a second electrode of metallic wire 40 which is led in a manner similar to the wire 32, but insulated from the same, to a terminal 42. The electrode support 8 is also provided with a plurality of axial drainage grooves 44 at its lower end.

At its upper end the conical surface 24 of the electrode support 8 mates with the capillary tube 14, which is counterbored into a matching conical surface and into a tiny chamber 46. The capillary tube 14 has a restricted duct 48 of capillary size which leads solution S at a controlled and slow rate from the top container 4 to the chamber 46. The solution S in the chamber 46 wets and flows down over the electrode support 8 through the slot 26 and the narrow passages made by the radial grooves 28. Thence it flows down over the entire electrode support 8 and wires 32 and 40, keeping these surfaces wetted by a flow that is only a drop every few minutes. The used or spent solution, after passing over the two wires 32 and 40, then flows down into the bottom container 6 through the passages formed by the axial drainage grooves 44 in the electrode support 8.

The sleeve 10 in conjunction with the electrode support 8 forms a thin annular passage 50. The gases enter the device at an inlet 52, flowing through the entrance chamber 16, thence through the annular passage 50, thence through gas escape passages 54 in the cup 18, thence into the bottom container 6 and through an outlet 56; and this flow may be influenced in any suitable manner, as by a pump P connected to the outlet 56. Because of the restricted area of the annular passage 50, gases are led into intimate contact with the thin film of solution S flowing down the electrode support 8.

For purposes of using the subject invention a direct current potential is applied across the terminals 42 and 36 from the electrodes 32 and 40. Included in the circuit is a meter 58, such as a micro-ammeter, or other transducer to measure the current. The current may be supplied by a battery 60, the potential of which is divided into an appropriate value by a potentiometer 62. The battery 60, together with the potentiometer 62, meter 58, electrodes 32 and 40, and the continuous film of solution S on the electrode support 8 complete an electrolytic circuit. In the presently preferred construction for the sensing of ozone the wire of the electrodes 32 and 40 is bright platinum of the order of .003″ diameter. The width of the annular passage 50 is of the order of .020″, with the depth of the bifilar helical grooves 30 and the annular groove 38 of the order of about the thickness of the wire. In the presently preferred construction the cathode is about 22 mm. long and 5 mm. in diameter, with 18 double turns of wire. The anode 40 is a single turn of wire.

The solution, here designated generally S in the top container 4, is a reagent sensitive to the constituent to be detected and measured there comprising, by way of one presently preferred example in the case of ozone, 100 cc. redistilled water, 2 grams potassium iodide, 20 grams potassium bromide, .4 gram $NaH_2PO_4.2H_2O$ and .32 gram $Na_2HPO_4$ or equivalent buffer to neutrality. The diameter of the restricted duct 48 of the capillary tube 14 is .005″, which gives a flow over the electrode support 8 of approximately 1 cc. per hour in the present circumstances. The slot 26 and radial grooves 28 in the conical surface 24 of the electrode support 8 insure proper flow and distribution over the electrode support 8.

The battery 60 supplies a potential of about 1.5 volts which is divided by the potentiometer 62 to permit application of about a 0.15 volt potential to the terminals 36 and 42. In the absence of ozone and with pure solutions, no current flows. If, however, ozone is present in the air flowing through the device, current flows between the terminals 36 and 42.

A possible chemical explanation of the cause of no current flow in the absence of ozone and the flow of current in the presence of ozone might be as follows: In the absence of ozone, one or both electrodes are polarized. When the entering gas contains ozone, iodine is formed in the neighborhood of the cathode by chemical oxidation:

$$2KI + O_3 + H_2O \rightarrow 2KOH + O_2 + I_2$$

This iodine is then reduced back to the iodide ion at the surface of the cathode:

$$I_2 + 2e \rightarrow 2I^-$$

At the anode the iodine is reformed by the reverse reaction. The reformed iodine is washed away downward into the bottom container 6 by the stream of solution and cannot react again.

Thus, for each molecule of ozone two electrons flow in the electric circuit and this flow is determined by the rate of arrival of ozone at the device and can be measured by the micro-ammeter 58 or by any other suitable device of which the details are not material here. For ozone concentrations expected to be found in the atmosphere and for an air flow of about 140 cc./minute, the current produced is 0 to about 7 micro-amperes.

As already stated the exterior of the electrode support 8 is finely ground to improve its wettability. Conversely, the interior surface of the sleeve 10 is treated or coated, as with a silicone, to minimize wetting thereof by the solution.

Variations in the details supplied here by way of example and on the basis of present experience will undoubtedly occur to those versed in the art, all without departure from the spirit and scope of the invention.

What is claimed is:

1. Apparatus for sensing and measuring a constituent of a gas mixture, comprising: a support of non-conducting material; an electrolytic circuit including a source of electric potential, a first electrode connected to said source and carried by and extending substantially the entire length of said support and a second electrode connected to said source and carried by said support on the same surface as said first electrode; said first and second electrodes being formed of the same substantially chemically inert material; a container above the support for containing a solution of a reagent specific to said constituent; conduit means connected to the container and leading to the upper end of the support for delivering solution to flow downwardly in a thin film over the support and electrodes; jacket means loosely surrounding the support and the electrodes to provide a gas chamber, said jacket means being closed except for the provision of a gas inlet and a gas outlet; means for causing a gas mixture to flow into said inlet, through the chamber and in contact with the solution and out of said outlet; and means connected in said circuit for measuring any flow of electrons in the circuit as produced by a reaction in the chamber.

2. The invention defined in claim 1, in which: the support is a glass rod.

3. The invention defined in claim 2, in which: the exterior surface of the rod is ground to improve its wetting characteristics.

4. The invention defined in claim 2, in which: the exterior of the rod is formed with a helical groove and one electrode is wound on said rod by being received in said groove.

5. The invention defined in claim 1, in which: the interior surface of the jacket means is treated to minimize wetting thereof by the solution.

6. The invention defined in claim 1, in which: the one electrode is wound as a helix on the support.

7. The invention defined in claim 1, including: an external housing surrounding the jacket means.

8. Apparatus for sensing and measuring trace constituents in the air or other gas; said apparatus comprising an elongated upright support member of electrically insulating substantially impermeable material; an electrolytic circuit including a source of electric potential, a first substantially chemically inert electrode connected to said source and carried by and extending substantially the entire length of said support member on the outside surface thereof, a second substantially chemically inert electrode connected to said source and carried by said support member on the outside surface thereof below said first electrode, said first and second electrodes being spaced one from the other; a container above the support member for containing a fluid reagent capable of reacting with the trace constituent to provide electron flow in the circuit; conduit means connected to the container and leading to the upper end of the support member for delivering the reagent thereto and releasing it to flow downwardly over the support member, said first electrode and then said second electrode in a thin film; said conduit means being designed to meter the delivery of the reagent by gravity at a substantially constant rate; jacket means loosely surrounding the support member and the electrodes to provide a small volume gas chamber surrounding said thin film, said jacket means being closed except for the provision of a gas inlet and a gas outlet; means for causing gas to flow into said inlet, through the chamber and in contact with the reagent and out of said outlet; a receptacle open to the lower end of said chamber for receiving and storing exhausted solution which has flowed over said support and electrodes, and means connected to said circuit for measuring any flow of electrons in the circuit provided by a reaction in the chamber.

9. The invention defined in claim 8, in which: the support is a glass rod.

10. The invention defined in claim 9, in which: the exterior surface of the rod is ground to improve its wetting characteristics.

11. The invention defined in claim 9, in which: the exterior of the rod is formed with a helical groove and one electrode is wound on said rod by being received in said groove.

References Cited in the file of this patent

UNITED STATES PATENTS

| | | |
|---|---|---|
| 1,513,558 | Parker | Oct. 28, 1924 |
| 2,651,612 | Haller | Sept. 8, 1953 |
| 2,805,191 | Hersch | Sept. 3, 1957 |
| 2,830,945 | Keidel | Apr. 15, 1958 |
| 2,861,926 | Jacobson | Nov. 25, 1958 |
| 2,943,028 | Thayer et al. | June 28, 1960 |

OTHER REFERENCES

Paneth et al.: Nature 1941, vol. 147, pages 614–615.